United States Patent
Kim et al.

(10) Patent No.: US 7,944,360 B2
(45) Date of Patent: May 17, 2011

(54) TEMPERATURE SENSOR USING ABRUPT METAL-INSULATOR TRANSITION (MIT) AND ALARM COMPRISING THE TEMPERATURE SENSOR

(75) Inventors: Hyun-Tak Kim, Daejeon (KR);
Kwang-Yong Kang, Daejeon (KR);
Yong-Wook Lee, Daejeon (KR);
Byung-Gyu Chae, Daejeon (KR);
Bong-Jun Kim, Daejeon (KR);
Sang-Kuk Choi, Daejeon (KR); Sun-Jin Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 339 days.

(21) Appl. No.: 12/090,084

(22) PCT Filed: Jun. 27, 2006

(86) PCT No.: PCT/KR2006/002479
§ 371 (c)(1),
(2), (4) Date: Apr. 11, 2008

(87) PCT Pub. No.: WO2007/043743
PCT Pub. Date: Apr. 19, 2007

(65) Prior Publication Data
US 2008/0297358 A1    Dec. 4, 2008

(30) Foreign Application Priority Data

Oct. 12, 2005    (KR) .................. 10-2005-0096240
Feb. 17, 2006    (KR) .................. 10-2006-0015636

(51) Int. Cl.
*G08B 17/00*    (2006.01)

(52) U.S. Cl. ........ 340/584; 340/585; 340/586; 340/588; 340/589; 340/596; 340/635; 340/870.17

(58) Field of Classification Search .................. 340/584, 340/585, 586, 588, 589, 596, 635, 870.17
See application file for complete search history.

(56) References Cited

U.S. PATENT DOCUMENTS

| | | | | |
|---|---|---|---|---|
| 6,092,926 | A | * | 7/2000 | Still et al. ................. 374/141 |
| 6,466,132 | B1 | * | 10/2002 | Caronna et al. ............. 340/584 |
| 6,624,463 | B2 | | 9/2003 | Kim et al. |
| 2007/0072060 | A1 | * | 3/2007 | Chang et al. ................. 429/62 |

FOREIGN PATENT DOCUMENTS

CN    2045509 U    10/1989
(Continued)

OTHER PUBLICATIONS

Kim et al., "Mechanism and Observation of Mott Transition in VO2-Based Two-and-Three Dimensional Devices," *New Journal of Physics*, 2004, vol. 6 No. 52.

(Continued)

*Primary Examiner* — Tai T Nguyen

(57) ABSTRACT

Provided are a temperature sensor using a metal-insulator transition (MIT) device subject to abrupt MIT at a specific temperature and an alarm including the temperature sensor. The abrupt MIT device includes an abrupt MIT thin film and at least two electrode thin films that contacts the abrupt MIT thin film. The abrupt MIT device generates abrupt metal-insulator transition at a specific transition temperature. The alarm includes a temperature sensor comprising an abrupt MIT device, and an alarm signaling device serially connected to the temperature sensor. Accordingly, the alarm can be manufactured to have a simple circuit and be of a small size by including the temperature sensor using an abrupt MIT device.

12 Claims, 5 Drawing Sheets

FOREIGN PATENT DOCUMENTS

| | | |
|---|---|---|
| JP | 06-058821 A | 3/1994 |
| JP | 06-044109 Y | 11/1994 |
| JP | 10-056177 | 2/1998 |
| KR | 1020060006195 A | 1/2006 |

OTHER PUBLICATIONS

International Search Report for PCT/KR06/002479, dated Oct. 19, 2006 Korean Intellectual Property Office.

Wang Qi-Fang et al., "Asymmetric Hubbard Model and Mott Metal-Insulator Transition", Journal of East China Shipbuilding Institute (Natural Science Edition), Feb. 2004, pp. 41-45, vol. 18, No. 1.

Hyun-Tak Kim et al., "Mechanism and observation of Mott transition in $VO_2$ -based two- and three-terminal devices", New Journal of Physics, May 17, 2004, pp. 2-21/E, vol. 6, No. 52, IOP Publishing Ltd and Deutsche Physikalische Gesellschaft.

* cited by examiner

TEMPERATURE SENSOR USING ABRUPT METAL-INSULATOR TRANSITION (MIT) AND ALARM COMPRISING THE TEMPERATURE SENSOR

CROSS REFERENCE TO RELATED APPLICATIONS

This application is a National Stage of International Application No. PCT/KR2006/002479, filed Jun. 27, 2006, and which claims the benefit of Korean Patent Application No. 10-2005-0096240, filed Oct. 12, 2005 and Korean Patent Application No. 10-2006-0015636, filed Feb. 17, 2006, the disclosures of all three applications being incorporated herein by reference.

TECHNICAL FIELD

The present invention relates to a sensor and an alarm, and more particularly, to a temperature sensor using a metal-insulator transition (MIT) device subject to abrupt MIT at a specific temperature and an alarm including the temperature sensor.

BACKGROUND ART

Precise temperature measurement and management are very important across the whole industry. Temperature measurement and management are executed using a temperature sensor that senses a specific temperature. An example of a temperature sensor is a thermistor which is the cheapest and convenient.

A thermistor is a semiconductor which is formed by mixing oxides of cobalt, copper, manganese, iron, nickel, titanium, etc. to have an appropriate resistivity and an appropriate temperature coefficient and then sintering the mixture of the oxides. The conductivity of a thermistor varies according to a change in the temperature of its surroundings. In contrast with general metal, a thermistor has a negative temperature coefficient (NTC) in which a resistance value decreases as a temperature increases. This thermistor is referred to as an NTC thermistor. The NTC thermistor detects a temperature and is usually used in an apparatus which drives a relay switch to generate an alarm signal.

FIG. 1 is a circuit diagram showing a conventional alarm using a conventional thermistor. Referring to FIG. 1, the conventional alarm includes a sensor part (which is defined by the rectangular dotted line) and an alarm signal part. The sensor part includes a thermistor 10, an amplifier 20, and a transistor 30. The alarm signal part includes a buzzer 50 and a light emitting diode 60. The sensor part and the alarm signal part are connected to each other via a relay switch 40.

In an operation of the conventional alarm, as the resistance of the thermistor 10 changes according to a temperature change, a voltage at the negative input port of the amplifier 20 changes. Accordingly, an output voltage of the amplifier 20 changes. The output voltage is input to the base of the transistor 30. The transistor 30 is turned on by the output voltage corresponding to a specific temperature. Accordingly, the relay switch 40 is also turned on and operates the buzzer 50 and the light emitting diode 60.

The conventional alarm using the thermistor 10 is widely used. However, as shown in FIG. 1, the conventional alarm has complicated circuitry because it includes the amplifier 20, the transistor 30, and a plurality of resistors.

Another example of the temperature sensor is a temperature sensor using a bimetal. Although the temperature sensor using a bimetal is also widely used, bimetal has a problem in that the range of specific temperatures is too wide.

DISCLOSURE OF INVENTION

Technical Problem

The present invention provides a temperature sensor capable of precisely sensing a specific temperature and an alarm having a simple circuitry by including the temperature sensor.

Technical Solution

According to an aspect of the present invention, there is provided a temperature sensor comprising an abrupt metal-insulator transition (MIT) device, the abrupt MIT device including an abrupt MIT thin film and at least two electrode thin films that contacts the abrupt MIT thin film. The abrupt MIT device generates abrupt metal-insulator transition at a specific transition temperature.

The abrupt MIT device has a characteristic of an insulator below the transition temperature and has a characteristic of a metal at or over the transition temperature.

The abrupt metal-insulator transition thin film is formed of at least one material selected from the group consisting of an inorganic semiconductor to which low-concentration holes are added, an inorganic insulator to which low-concentration holes are added, an organic semiconductor to which low-concentration holes are added, an organic insulator to which low-concentration holes are added, a semiconductor to which low-concentration holes are added, an oxide semiconductor to which low-concentration holes are added, and an oxide insulator to which low-concentration holes are added, wherein the above-described materials each include at least one of oxygen, carbon, a semiconductor element (i.e., groups III-V and groups II-IV), a transition metal element, a rare-earth element, and a lanthanum-based element.

Each of the electrode thin films is formed of at least one material selected from the group consisting of W, Mo, W/Au, Mo/Au, Cr/Au, Ti/W, Ti/Al/N, Ni/Cr, Al/Au, Pt, Cr/Mo/Au, $YB_2Cu_3O_{7-d}$, Ni/Au, Ni/Mo, Ni/Mo/Au, Ni/Mo/Ag, Ni/Mo/Al, Ni/W, Ni/W/Au, Ni/W/Ag, and Ni/W/Al.

The electrode thin film is connected to an external electric or electronic circuit so that the temperature sensor senses a temperature equal to or greater than the transition temperature using a change in the amount of current flowing in the abrupt metal-insulator transition device.

According to another aspect of the present invention, there is provided an alarm. The alarm includes a temperature sensor comprising an abrupt MIT device, and an alarm signaling device serially connected to the temperature sensor.

The alarm signaling device generates at least one of an electrical signal, light, and sound. The alarm signaling device may be one of a light emitting diode and a buzzer, each of which is serially connected to the temperature sensor. Alternatively, the alarm signaling device may include both the light emitting diode and the buzzer.

According to another aspect of the present invention, there is provided an alarm. The alarm includes a temperature sensor comprising an abrupt metal-insulator transition device, a relay switch connected to the temperature sensor, and an alarm signaling device serially connected to the relay switch.

The temperature sensor senses a temperature equal to or higher than the transition temperature and transmits a signal corresponding to the sensed temperature to the alarm signaling device by turning on the relay switch. The relay switch is turned on by a current that abruptly changes at or over the transition temperature.

ADVANTAGEOUS EFFECTS

A temperature sensor according to the present invention is manufactured using an abrupt MIT device, and thus has a simple structure and can accurately sense a temperature.

In addition, an alarm according to the present invention uses a temperature sensor using an abrupt MIT device and thus has a very simple circuit and is cost-effective.

Furthermore, the alarm according to the present invention uses an abrupt MIT device that can be greatly miniaturized and thus can be much more compact than a conventional alarm manufactured using a thermistor or bimetal.

BEST MODE

Figure 1:
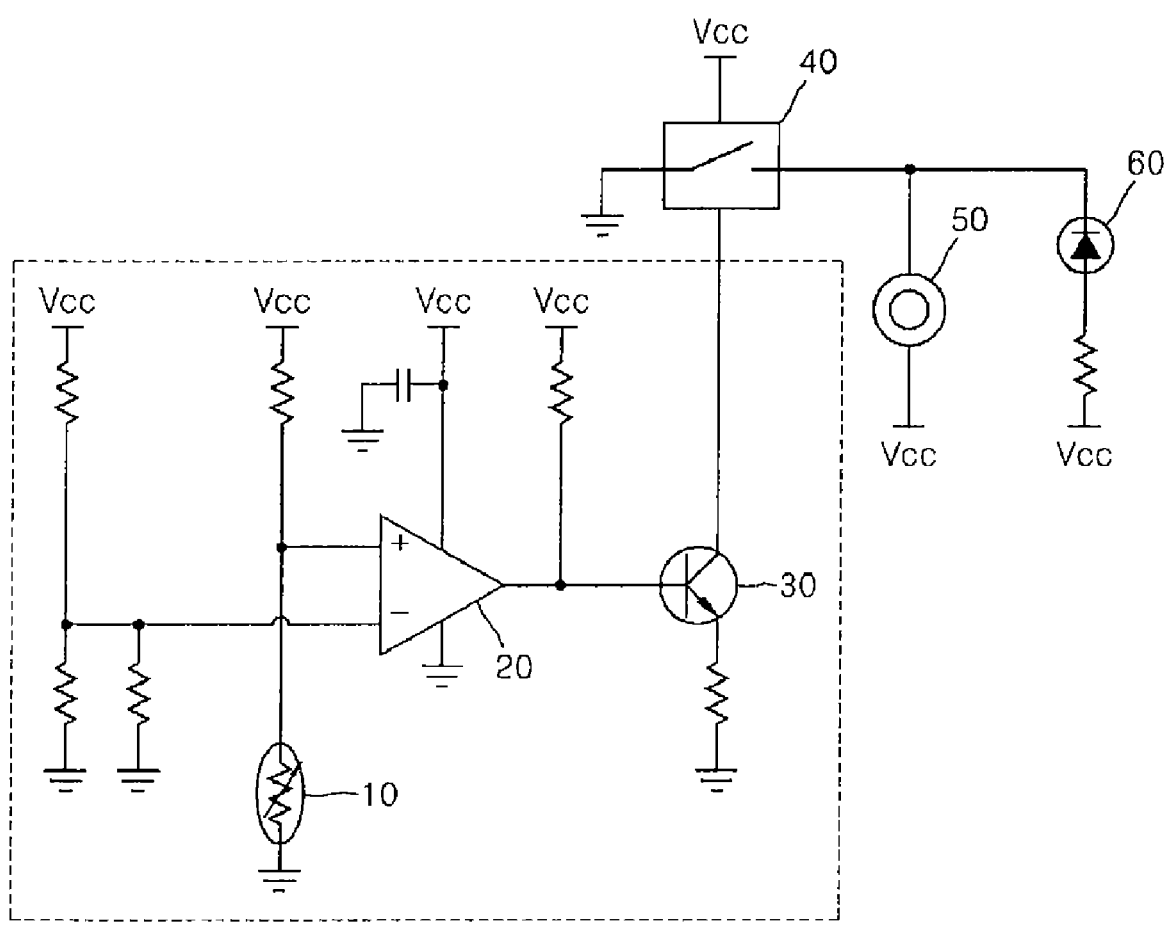
FIG. 1 is a circuit diagram showing a conventional alarm using a conventional temperature sensor, that is, a thermistor.

The present invention will now be described more fully with reference to the accompanying drawings, in which exemplary embodiments of the invention are shown. It will be understood that when an element is referred to as being 'on' another element, it can be directly on the other element, or intervening elements may also be present. In the drawings, the thicknesses or sizes of elements are exaggerated for clarity. To facilitate understanding, identical reference numerals have been used, where possible, to designate identical elements that are common to the figures.

The present invention proposes a temperature sensor that senses a temperature using a new device whose electrical characteristics abruptly vary according to an external specific temperature, and an alarm including the temperature sensor. Hereinafter, the new device is referred to as an abrupt metal-insulator transition (MIT) device. Hereinafter, a temperature at which an abrupt MIT device generates MIT is referred to as a transition temperature.

An abrupt MIT device includes an abrupt MIT thin film (hereinafter, referred to as a transition thin film) and at least two electrode thin films. An abrupt MIT device may have either a stacked (or vertical) structure or a planar-type structure according to the locations of a transition thin film and electrode thin films.

Figure 2:
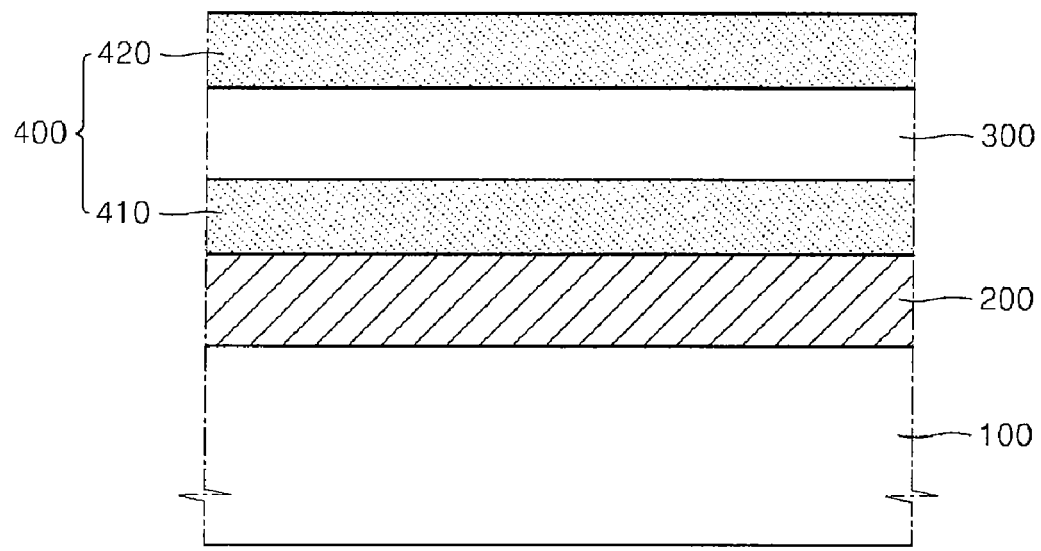
FIG. 2 is a cross-section of a stacked-type abrupt metal-insulator transition (MIT) device.

FIG. 2 is a cross-section of an abrupt MIT device having a stacked structure. Referring to FIG. 2, the abrupt MIT device having a stacked structure includes a substrate 100, a buffer layer 200 formed on the substrate 100, a first electrode thin film 410, a transition thin film 300, and a second electrode thin film 420. The first electrode thin film 410, the transition thin film 300, and the second electrode thin film 420 are sequentially formed on the buffer layer 200.

The buffer layer 200 buffers a lattice mismatch between the substrate 100 and the first electrode thin film 410. When the lattice mismatch between the substrate 100 and the first electrode thin film 410 is very small, the first electrode thin film 410 may be formed directly on the substrate 100 without the buffer layer 200. The buffer layer 200 may include a $SiO_2$ or $Si_3N_4$ film.

The transition thin film 300 may be formed of at least one material selected from the group consisting of an inorganic semiconductor having a low-concentration of holes, an inorganic insulator having a low-concentration of holes, an organic semiconductor having a low-concentration of holes, an organic insulator having a low-concentration of holes, a semiconductor having a low-concentration of holes, an oxide semiconductor having a low-concentration of holes, and an oxide insulator having a low-concentration of holes. The above-described materials each include at least one of oxygen, carbon, a semiconductor element (i.e., groups III-V and groups II-IV), a transition metal element, a rare-earth element, and a lanthanum-based element. The transition thin film 300 may be formed of an n-type semiconductor having very high resistance and an n-type insulator having very high resistance.

An electrode thin film 400, including the first and second electrode thin films 410 and 420, is formed of at least one of W, Mo, W/Au, Mo/Au, Cr/Au, Ti/W, Ti/Al/N, Ni/Cr, Al/Au, Pt, Cr/Mo/Au, $YB_2Cu_3O_{7-d}$, Ni/Au, Ni/Mo, Ni/Mo/Au, Ni/Mo/Ag, Ni/Mo/Al, Ni/W, Ni/W/Au, Ni/W/Ag, and Ni/W/Al. The electrode thin film 400 may be formed using at least one deposition method of a sputtering deposition method, a vacuum deposition method, and an E-beam deposition method.

The substrate 100 is formed of at least one of Si, $SiO_2$, GaAs, $Al_2O_3$, plastic, glass, $V_2O_5$, $PrBa_2Cu_3O_7$, $YBa_2Cu_3O_7$, MgO, $SrTiO_3$, Nb-doped $SrTiO_3$, and silicon-on-insulator (SOI).

The electrical characteristics of an abrupt MIT device used in the present invention abruptly change according to the temperature. In other words, the abrupt MIT device has characteristics of an insulator when below a transition temperature and has characteristics of a metal at or over the transition temperature.

The abrupt MIT of the electrical characteristics of an abrupt MIT device from a metal to an insulator is disclosed in some papers, namely, New J. Phys. 6 (2004) 52 and http//xxx.lanl.gov/abs/cond-mat/0411328 and Appl. Phys. Lett. 86 (2005) 242101, and U.S. Pat. No. 6,624,463.

Figure 3:
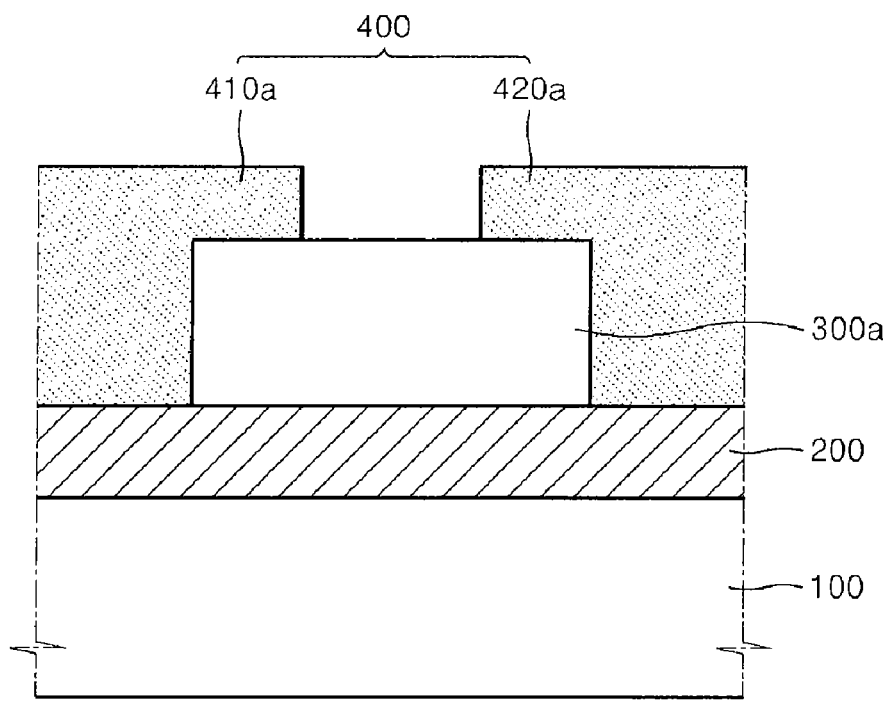
FIG. 3 is a cross-section of a planar-type abrupt MIT device.

FIG. 3 is a cross-section of an abrupt MIT device having a planar-type structure. Referring to FIG. 3, the abrupt MIT device having a planar-type structure includes a substrate 100, a buffer layer 200 formed on the substrate 100, a transition thin film 300a formed on a part of the upper surface of the buffer layer 200, and a first electrode thin film 410a and a second electrode thin film 420a which are formed on exposed portions of the buffer layer 200 and the lateral surfaces and the upper surface of the transition thin film 300a such as to face each other. In other words, the first and second electrode thin films 410a and 420a are separated from each other by the transition thin film 300a formed therebetween.

The buffer layer 200 buffers a lattice mismatch between the transition thin film 300a and the substrate 100. When the lattice mismatch between the substrate 100 and the transition thin film 300a is very small, the transition thin film 300a may be formed directly on the substrate 100 without forming the buffer layer 200 therebetween.

Of course, the buffer layer 200, the electrode thin film 400, the transition thin film 300a, and the substrate 100 may be formed of the materials mentioned above with reference to FIG. 2. The stacked-type and planar-type abrupt MIT devices are miniaturized in units of micrometers (μm) and manufactured without incurring a high cost.

Figure 4:
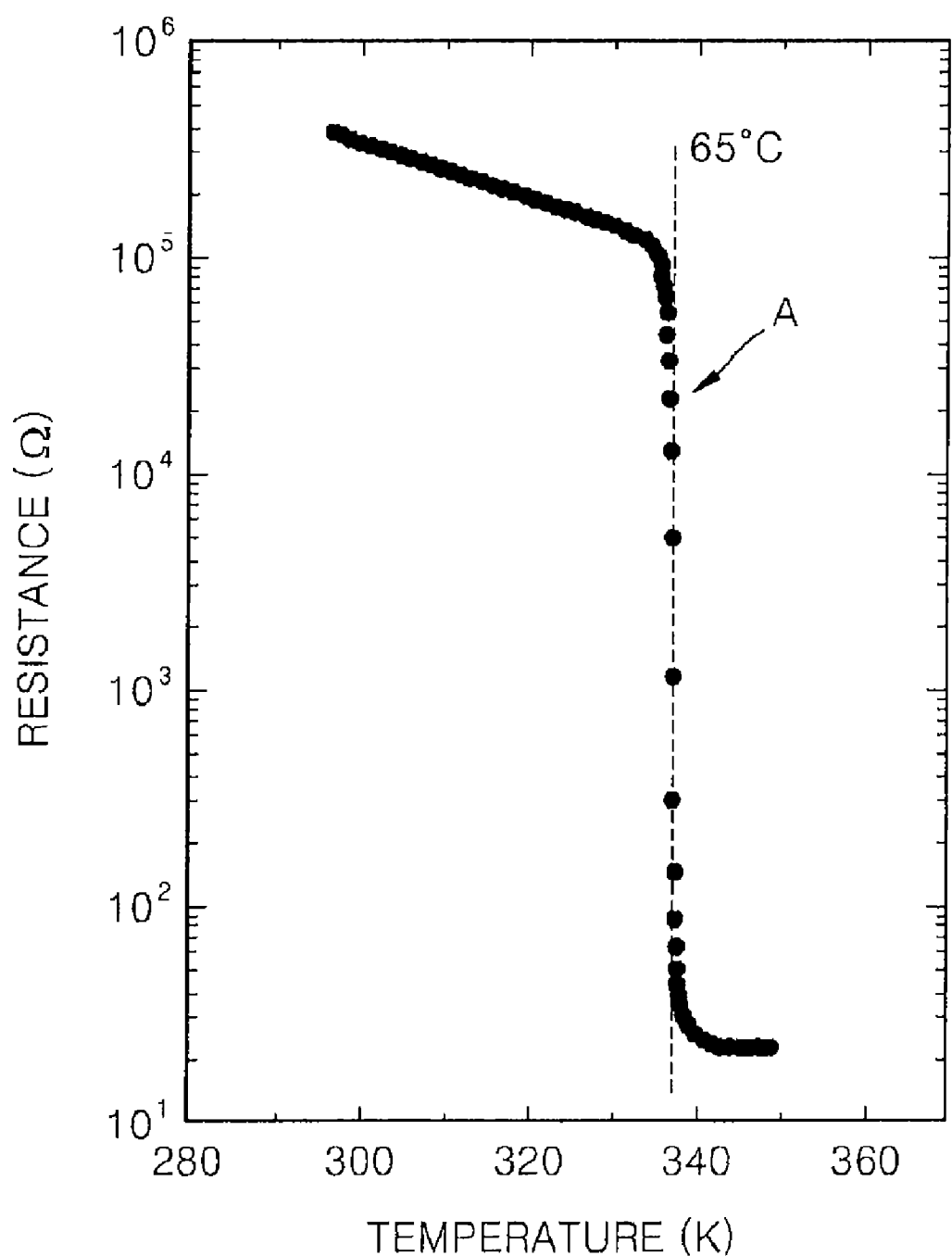
FIG. 4 is a graph showing a temperature-resistance curve of a temperature sensor using an abrupt MIT device formed of vanadium oxide ($VO_2$) that causes abrupt MIT at a specific temperature.

FIG. 4 is a graph showing a temperature-resistance curve of a temperature sensor using an abrupt MIT device formed of vanadium oxide ($VO_2$) that causes abrupt MIT at a transition temperature. Referring to FIG. 4, the horizontal axis indicates an absolute temperature (K), and the vertical axis indicates a resistance (Ω) of the temperature sensor. The temperature sensor has high resistance, that is, a resistance of $10^5$Ω or higher, at about 338K or less and has characteristics similar to the characteristics of an insulator. However, the resistance of the temperature sensor abruptly drops at about 338 K, that is, about 65° C. (A) and thus has characteristics of a metal having a resistance of about several tens of Ω. The reason why the resistance of the temperature sensor rapidly changes is because the abrupt MIT device undergoes abrupt MIT at about 65° C. Hence, the transition temperature of the abrupt MIT device of the temperature sensor used in the present experiment is about 65° C.

In the present experiment, abrupt MIT occurs in the $VO_2$ temperature sensor at 65° C. However, the transition temperature may be changed by doping the $VO_2$ temperature sensor with a proper material. The transition temperature may also be changed by changing the materials or structures of the components of the abrupt MIT device. Hence, a temperature sensor according to the present invention can be formed using an abrupt MIT device which generates abrupt MIT at a transition temperature.

The temperature sensor is connected to an electrical or electronic element or the like in order to detect a temperature equal to or higher than the transition temperature and inform the outside of the result of the detection. Moreover, because an electrical characteristic, that is, the resistance, of the temperature sensor drastically changes at the transition temperature, a predetermined voltage should be continuously applied to the transition thin film through the electrode thin film.

By using the abrupt MIT device, the temperature sensor according to the present invention can precisely sense a temperature greater than a specific temperature corresponding to the transition temperature of the abrupt MIT device. Also, the temperature sensor can be miniaturized and can be manufactured without incurring a high cost.

Figure 5:
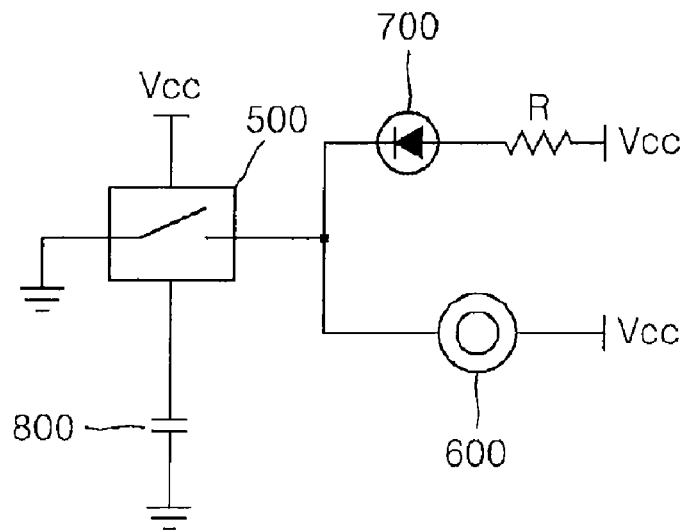
FIG. 5 is a circuit diagram of an alarm including a temperature sensor using an abrupt MIT device, according to an embodiment of the present invention.

FIG. 5 is a circuit diagram of an alarm including a temperature sensor using an abrupt MIT device, according to an embodiment of the present invention. Referring to FIG. 5, the alarm includes a temperature sensor 800 using an abrupt MIT device, a relay switch 500 connected to the temperature sensor 800, a buzzer 600, and a light emitting diode 700. The buzzer 600 and the light emitting diode 700 are connected to the relay switch 500. Power supply voltages Vcc are applied to the relay switch 500, the buzzer 600, and the light emitting diode 700. The temperature sensor 800 is manufactured using an abrupt MIT device that provokes abrupt MIT at a transition temperature, as described above.

The buzzer 600 and the light emitting diode 700 are alarm signaling devices that indicate that the temperature sensed by the temperature sensor 800 is equal to or higher than transition temperature. That is, if the sensed temperature is equal to or higher than the transition temperature, the buzzer 600 makes a sound and the light emitting diode 700 emits light. The buzzer 600 and the light emitting diode 700 are only examples of an alarm signaling device. Various electrical or electronic devices that can generate an electric signal, light, sound, etc. may be used as the alarm signaling device. Although the buzzer 600 and the light emitting diode 700 are both used in the present embodiment, one of the two may be used.

As shown in FIG. 5, the light emitting diode 700 may be serially connected to a resistor R to protect the light emitting diode 700. In FIG. 5, the alarm signaling devices 600 and 700 are located near the temperature sensor 800. However, the alarm signaling devices 600 and 700 may be set up in a control center, etc. far away from the temperature sensor 800 and be connected to the temperature sensor 800 through electrical wires. It is natural that the temperature sensor 800 is installed in a place where measuring the temperature change is required.

In an operation of the alarm of the present embodiment, when an external temperature is equal to or higher than the transition temperature, the temperature sensor 800 provokes abrupt MIT and thus current suddenly increases. The increased current turns on the relay switch 500. Accordingly, the current flows into the buzzer 600 and the light emitting diode 700, so that the buzzer 600 and the light emitting diode 700 generate a sound and an optical signal.

In the present embodiment, the large number of component circuits of the sensor part of the conventional alarm of FIG. 1 are replaced by the temperature sensor 800 using one abrupt MIT device. Therefore, a simple alarm circuit can be manufactured. Moreover, the temperature sensor 800 precisely controls the transition temperature of the abrupt MIT device, so that the alarm can operate at an exact temperature. In addition, since the temperature sensor 800 is compact and cost-effective as described above, the alarm of the present embodiment can be miniaturized and can be manufactured without incurring a high cost.

Figure 6:
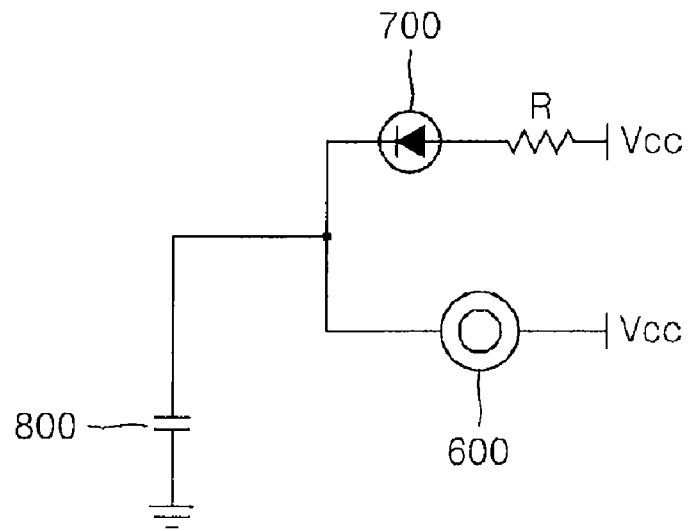
FIG. 6 is a circuit diagram of an alarm including a temperature sensor using an abrupt MIT device, according to another embodiment of the present invention.

FIG. 6 is a circuit diagram of an alarm including a temperature sensor using an abrupt MIT device, according to another embodiment of the present invention. The alarm of FIG. 6 is similar to that of the previous embodiment except that a relay switch is omitted. Hence, a power supply voltage Vcc applied to the relay switch is also omitted.

In an operation of the alarm of the present embodiment, the temperature sensor 800 using an abrupt MIT device provokes an abrupt MIT at a transition temperature, and thus a great amount of current flows. Hence, the current also flows into the buzzer 600 and the light emitting diode 700 and thus an optical signal and a sound are generated. Of course, a small amount of current also flows at or below the transition temperature. But, the small current is feeble to operate the buzzer 600. Moreover, since most of the voltages are applied to the temperature sensor 800, voltages at both ends of the light emitting diode 700 are feeble to turn on the light emitting diode 700.

Similar to the previous embodiment, in the present embodiment, not only the buzzer 600 and the light emitting diode 700 but also the other various electrical or electronic devices that can generate an electric signal, light, a sound, etc. may be used as an alarm signaling device. Only one of the buzzer 600 and the light emitting diode 700 may be used. Of course, the alarm signaling devices 600 and 700 may be set up in a far control center, etc. and be connected to the temperature sensor 800 through electrical wires. In the present embodiment, no relay switches are included, contributing to simplifying the internal circuit of the alarm.

Figure 7:
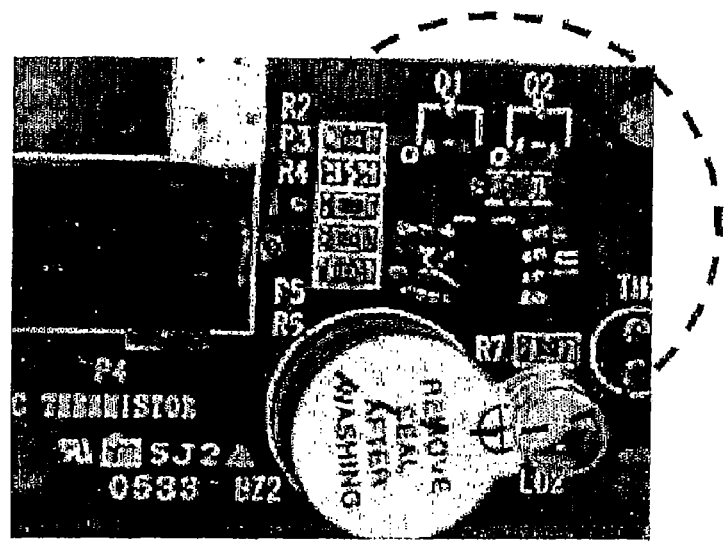
FIG. 7 is a picture of a conventional alarm including all of the elements of FIG. 1 except for a relay switch.

FIG. 7 is a picture of a conventional alarm manufactured by including all of the elements of the circuitry of FIG. 1 except for the relay switch 40. In FIG. 7, the dotted circle line indicates a conventional temperature sensor part whose circuit is complicate.

Figure 8:
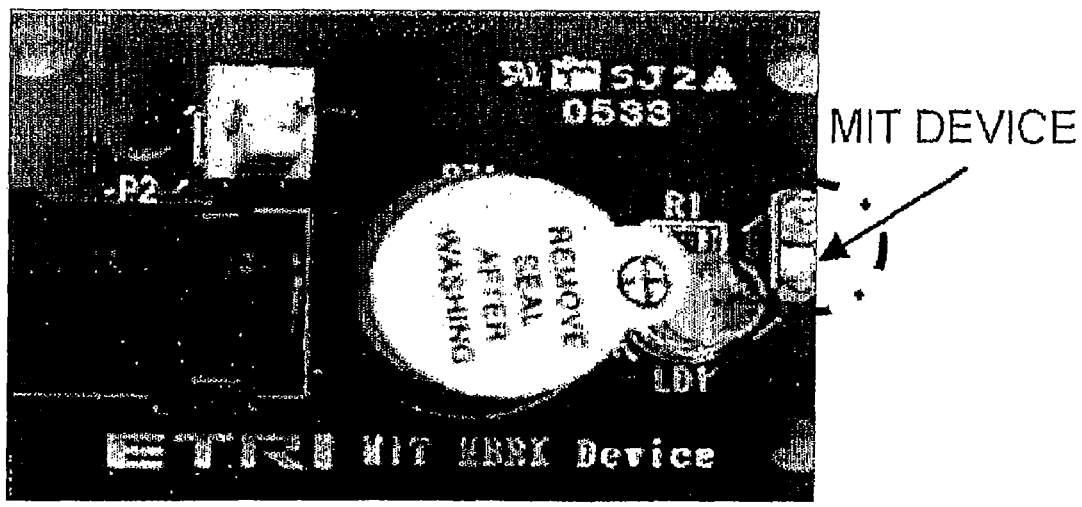
FIG. 8 is a picture of the alarm shown in FIG. 5.

FIG. 8 is a picture of the alarm of FIG. 5. As shown in FIG. 8, the alarm can be manufactured to have a simple structure by using the temperature sensor using the abrupt MIT device. That is, the small dotted circle indicated by an arrow is a temperature sensor using an abrupt MIT device. The single temperature sensor replaces the temperature sensor part of a conventional alarm.

As described above, a temperature sensor according to the present invention is manufactured using an abrupt MIT device, and thus has a simple structure and can accurately sense a temperature.

In addition, an alarm according to the present invention uses a temperature sensor using an abrupt MIT device and thus has a very simple circuit and is cost-effective.

Furthermore, the alarm according to the present invention uses an abrupt MIT device that can be greatly miniaturized and thus can be much more compact than a conventional alarm manufactured using a thermistor or bimetal.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention relates to a temperature sensor using a metal-insulator transition (MIT) device subject to abrupt MIT at a specific temperature and an alarm including the temperature sensor. The sensor and alarm according to the present invention can be greatly miniaturized using an abrupt MIT device and thus can be much more compact than a conventional alarm manufactured using a thermistor or bimetal.

The invention claimed is:

1. An alarm comprising:
    a temperature sensor comprising an abrupt metal-insulator transition device; and
    an alarm signaling device serially connected to the temperature sensor,
    wherein the abrupt MIT device comprises an abrupt metal-insulator transition thin film and at least two electrode thin films contacting the metal-insulator transition thin film; and
    the abrupt metal-insulator transition device has a characteristic of an insulator below the transition temperature and has a characteristic of a metal at or over the transition temperature.

2. The temperature sensor of claim 1, wherein the electrode thin film is connected to an external electric or electronic circuit so that the temperature sensor senses a temperature equal to or greater than the transition temperature using a change in the amount of current flowing in the abrupt metal-insulator transition device.

3. The temperature sensor of claim 1, wherein the abrupt metal-insulator transition device comprises:
    a substrate;
    a first electrode thin film formed on the substrate;
    an abrupt metal-insulator transition thin film formed on the first electrode thin film, including low-concentration holes; and
    a second electrode thin film formed on the abrupt metal-insulator transition thin film.

4. The temperature sensor of claim 1, wherein:
    the abrupt metal-insulator transition device comprises:
    a substrate;
    an abrupt metal-insulator transition thin film formed on a part of the upper surface of the substrate, including low-concentration holes;
    a first electrode thin film formed on an exposed part of the upper surface of the substrate, one lateral surface of the abrupt metal-insulator transition thin film, and a part of the upper surface of the abrupt metal-insulator transition thin film; and
    a second electrode thin film formed on the remaining exposed part of the upper surface of the substrate, the other lateral surface of the abrupt metal-insulator transition thin film, and the other part of the upper surface of the abrupt metal-insulator transition thin film such as to face the first electrode thin film; and the first and second electrode thin films are separated from each other.

5. The alarm of claim 1, wherein the temperature sensor senses a temperature equal to or higher than the transition temperature and transmits a signal corresponding to the sensed temperature to the alarm signaling device.

6. The alarm of claim 5, wherein the signal is a current that abruptly changes at or over the transition temperature.

7. The alarm of claim 1, wherein the alarm signaling device generates at least one of an electrical signal, light, and sound.

8. The alarm of claim 1, wherein the alarm signaling device is one of a light emitting diode and a buzzer each of which is serially connected to the temperature sensor.

9. The alarm of claim 1, further comprising a relay switch installed between the temperature sensor and the alarm signaling device.

10. The alarm of claim 9, wherein the temperature sensor senses a temperature equal to or higher than the transition temperature and transmits a signal corresponding to the sensed temperature to the alarm signaling device by turning on the relay switch.

11. The alarm of claim 10, wherein the relay switch is turned on by a current that abruptly changes at or over the transition temperature.

12. The alarm of claim 11, wherein the alarm signaling device is one of a light emitting diode and a buzzer that are serially connected to the relay switch.

* * * * *